Figure 1:
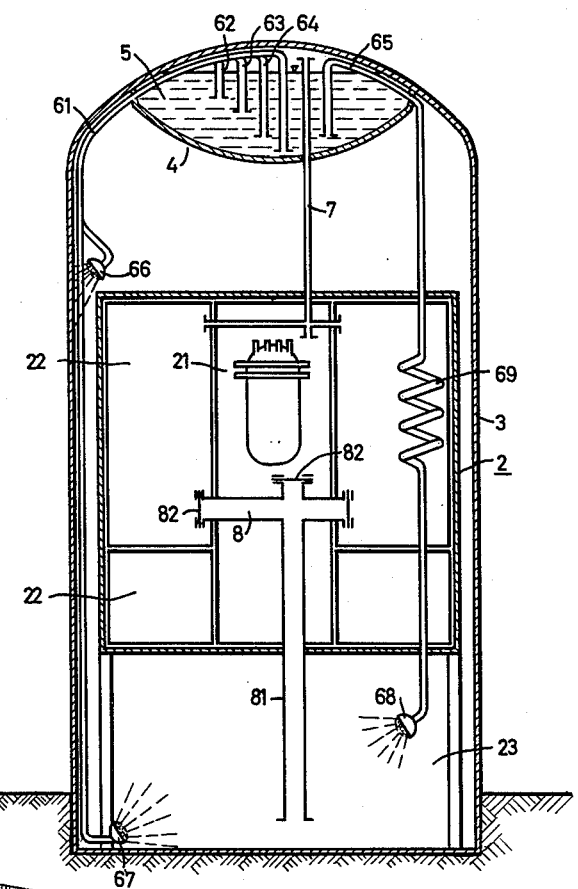

United States Patent Office 3,168,445
Patented Feb. 2, 1965

3,168,445
SAFETY EQUIPMENT FOR NUCLEAR POWER-REACTOR PLANTS
Albert Ziegler and Gerd Petersen, Erlangen, Germany, assignors to Siemens-Schuckertwerke Aktiengesellschaft, Berlin-Siemensstadt, Germany, a corporation of Germany
Filed May 24, 1962, Ser. No. 197,485
Claims priority, application Germany, June 14, 1961, S 74,331
6 Claims. (Cl. 176—38)

Our invention relates to protective equipment for nuclear power-reactor plants.

Public safety requires that the buildings for nuclear reactors of large power rating be shielded by a tightly sealed enclosure to prevent the escape of radioactive substances even in the event of most severe catastrophes, particularly if large amounts of energy are stored in the reactor system. This requirement is particularly significant for power reactors operating with water as coolant because in such cases the amount of energy storage is especially large.

Heretofore the solution of this problem has been seen in enclosing the reactor and the primary circulation system within a sealed and pressure-resistant enclosure capable of withstanding the pressure that may be build up if the entire energy stored in the system and possibly generated during a catastrophe is liberated. This principle leads to enclosures of 20 to 40 meters diameter for pressures of 4 to 7 at (superatmospheric). This approximately correspond to present-day tanks for storage of gas under pressure. Such enclosures are feasible in principle. However, it must be taken into account that the enclosure walls must be traversed by a large number of sluicing devices as well as by pipe and cable ducts which greatly aggravate the problem, and that the occurrence of maximum pressure stresses is accompanied by elevated temperatures whose distribution onto the various parts of the building and enclosure must be expected, generally, to be extremely non-uniform.

Although one may expect that a properly constructed steel enclosure will endure under such mechanical and thermal stresses, a large amount of damage and destruction to building structures and equipment components in the interior of the encosure due to pressure and temperature will be inevitable. The aim of further developments therefore has been, and still is, to obtain protection from damage not only with respect to the environment of a power-reactor plant, but also to prevent as much as possible the destructive effects in the power plant itself.

Predicated upon such considerations, tests have been performed towards suppressing from the outset the occurrence of excessively high pressures and high temperatures in the event of catastrophes. In this connection it has become known to provide for condensation of the issuing steam by means of sprinkler systems which are placed in operation under control by devices responsive to suitable measuring or sensing instruments. However, it is of decisive importance to the reliability and safety of a reactor plant that the operation of such sprinkler systems be initiated with absolute security because otherwise any slight failure in the sensing or releasing device may cause a catastrophe of major extent.

To achieve such reliability and security of reactor operation is the main object of our invention, particularly with respect to the buildings of power reactors having large amounts of energy stored in the cooling and working media.

According to our invention, the desired protection is predicated upon the principle of effecting condensation of issuing steam by means of water-sprinkling equipment. According to our invention, however, this is done with the aid of a syphon-type system embodying the following features.

At the highest point of the pressure-resistant enclosure of steel surrounding the reactor building structure proper, we provide a storage tank for sprinkler water. The outgoing pipes for sprinkler water enter into the tank from above on the syphon principle so as to terminate below the water level. The enclosed air chamber above the water level in the storage tank is connected by pipes with the reactor space proper located in the building beneath the water storage tank. The building further comprises another space, such as used for assembling work or storage of materials, this space being located at the bottom of the building structure or in any event beneath the reactor chamber proper. This additional space, hereinafter called "bottom space," is to serve as condensation chamber and for this purpose is provided with a number of sprinkler devices that are connected to the syphon pipes coming from the above-mentioned water tank.

Figure 2:
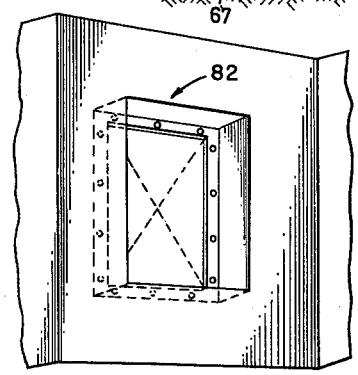

The invention will be more fully understood from the following description of an embodiment of an enclosed reactor building structure when considered in connection with the drawing, in which:

FIG. 1 is a diagrammatic sectional view of the reactor building structure constructed in accordance with our invention; and FIG. 2 is an enlarged view of a pressure-sensitive diaphragm forming part of our invention.

The reactor building proper, denoted by 2, consists of concrete. It is enclosed by a cylindrical enclosure 3 of steel peripherally spaced from the reactor building a distance of approximately 1 meter. The top of the steel cylinder is approximately semispherical. The enclosure is carefully anchored in the ground or on a suitable foundation. Located in the reactor building of concrete is the reactor space 21 proper. Pressure equalizing conduits 8 connect the reactor space 21 with operating and experimenting chambers that surround the reactor space. In normal operation, the pressure equalizing conduits are closed and sealed by diaphragms 82 of the type that will burst when subjected to greatly excessive pressure (FIG. 2). Another equalizing conduit 81 extends downwardly into the bottom space of approximately 9 m. height which is located beneath the reactor space proper. The conduit 81 has its lower opening located near the floor of space 23. Mounted in the bottom space are sprinkler devices 67 and 68 which are connected by pipes 61, 62, 63, 64 and 65 with the water tank 4 under the dome-shaped top of the steel enclosure. Further sprinkler devices 66 are mounted above the internal concrete building 2 and are likewise connected by pipes with the water tank. The air chamber above the water level in tank 4 is connected through a pipe 7 with the reactor space 21 proper so that a continuous pressure equalization exists between the air chamber above the water in the tank and the reactor space proper. Inserted into some of the syphon pipes, for example in pipe 61, are respective condensers 69 located in the outer chambers 22.

The preformance of the apparatus is as follows.

In the event of breakage in the reactor system, a steam-water mixture escapes. At first de-mixing takes place. The water collects at the floor and the steam is distributed through the equalizing conduits 8 which have a cross section of approximately two square meters, into the chambers 22 that surround the reactor space proper, and also into the bottom space 23. The equalizing conduits are opened by bursting of the diaphragms 82 at the tear lines represented by the dotted lines in FIG. 2. The necessary bursting pressure amounts to a few tenths of one atmosphere (superatmospheric). This pressure is also transmitted through the connecting pipe 7 to the air chamber above the water level in tank 4. This forces the water from tank 4, prior to pressure equalization due to bursting of the diaphragm 82, into the pipes 61 to 65 so that the water, in accordance with the syphon principle, flows through the pipes downward to the sprinkler devices.

At a total height of the steel enclosure of 40 m. there results a water pressure of about 4 at. in the bottom space 23, thus affording an intensive sprinkler action. By means of a few sprinkler devices 66 above the internal concrete building 2, at about 26 m. height which corresponds to a pressure of about 1.5 at., the cylindrical annular space along the steel enclosure is sprinkled with water from above.

As is apparent from the drawing, the pipes 61 to 65 have different entering depths with respect to the level of the water 5 contained in the storage tank 4. Hence, at the beginning of the sprinkler action all pipes conduct water, whereas individual pipes cease to participate in the sprinkler action as the water level is lowered. Consequently, at the start of a reactor accident the sprinkler action takes place with great energy, but after the pressure peak is eliminated, only a portion of the sprinkler action is continued thus greatly prolonging the time of sprinkler operation. For example, with ten pipes NW 100 at least a sprinkling quantity of 0.5 cubic meter per second can be attained so that without additional pumping the sprinkling would continue at least 15 seconds if all syphon pipes entered to the same depth into the water tank. However, due to the graduated entering depth of the pipes, the sprinkling time is correspondingly prolonged. The surface condensers 69 mounted in the chambers 22, cooled by the water that passes through the condensers, serves for additionally condensing the issuing steam.

A sprinkler system according to the invention for condensing the steam that escapes in the event of reactor failure, does not require any particular sensing or releasing devices and therefore virtually affords absolute reliability of operaiton.

It is required, however, that the water level in the storage tank be sufficiently high so that the water is initially pressed into the sprinkler pipes and commences syphon action prior to bursting of the diaphragms and hence prior to pressure equalization.

Due to the condensation of the issuing steam thus obtained it becomes possible to provide for pressure relief to such an extent that the steel enclosure can be designed for a considerably lower pressure than heretofore customary, for example only for 2 at.

The invention therefore has not only the advantage that the steel container can be made lighter in weight and hence becomes less costly, but that by avoidance of pressure and temperature peaks, major destruction within the reactor building and at the appertaining equipment is minimized or prevented. Furthermore, the major portion of any emerging radioactive fission products is absorbed by the sprinkler water which collects in the bottom space 23. When the collecting water in space 23 rises, the outlet opening of the pressure equalizing conduit 81 will become submerged beneath the water level so that the emerging steam completely condenses immediately when ascending in the collected water.

Since, as mentioned, the radioactive fission products are located to a great extent in the collected water, and the necessary treatment of the water, for example by ion exchange, is a relatively simple matter, the contamination of the other chambers in the reactor building equipped according to the invention is likewise relatively slight, and any necessary repair work and restarting of the reactor can be effected relatively soon after occurrence of failure.

It will be understood that the sprinkler devices illustrated on the drawing serve to exemplify the principle of the invention but are not intended to the complete with respect to structural details, since such devices as well as the other components to be used for the purposes of the invention are known as such. It will further be understood that the proper dosage of the sprinkler water can be adjusted not only by the different entering depths of the syphon pipes into the water tank, but also by the selection of different pipe cross sections or by adjustable throttle valves and the like devices.

Such and other modifications will be obvious to those skilled in the art, upon a study of this disclosure, and are indicative of the fact that our invention can be given a great variety of embodiments other than particularly illustrated and described herein, without departing from the essential features of our invention and within the scope of the claims annexed hereto.

We claim:

1. With a building structure for a nuclear power reactor of the type having large amounts of energy stored in cooling and working media, said building structure having a reactor space proper and having additional bottom space beneath said reactor space, the combination of safety equipment for minimizing the effects of a reactor accident comprising pressure-destructible diaphragm means normally blocking communication between said reactor space proper and said bottom space, a pressure-resistant steel enclosure containing said building structure, a storage tank for sprinkler water in the top region of said enclosure above said reactor space proper, an enclosed air chamber in said enclosure above the water level in said water tank, pipe lines connecting said air chamber with said reactor space, syphon pipes entering from above into the water tank and extending from below the water level upwardly and thence downwardly to said bottom space below said reactor space, and a number of sprinkler devices mounted in said bottom space and connected to said syphon pipes whereby said bottom space serves as a condensation chamber for vapor issuing in the event of reactor accident.

2. In a reactor building structure with safety equipment according to claim 1 said building structure comprising additional chambers separate from said reactor space proper and from said bottom space, pressure equalizer conduits interconnecting all of said spaces and chambers in said building structure, and said pressure-destructible diaphragm means normally closing said conduits.

3. A reactor building structure with safety equipment according to claim 1, comprising a pressure equalizer conduit connecting said reactor space proper with said bottom space, said pressure-destructible diaphragm means normally closing said conduit, said conduit extending downwardly close to the floor of said bottom space to as to have its lower opening immersed in sprinkler water if sufficient water collects in said bottom space.

4. In a reactor building structure with safety equipment according to claim 1, said syphon pipes extending in said tank respectively different depths so as to become successively inactive during lowering of the water level.

5. In a reactor building structure with safety equipment according to claim 1, said reactor building structure and said steel enclosure forming together a peripheral, cylindrical gap, and sprinkler means mounted above said gap and connected to said syphon pipes for cooling said enclosure.

6. A reactor building structure with safety equipment according to claim 1, comprising condenser means mounted inside said building structure and interposed between said syphon pipes and said sprinkler devices to be traversed by sprinkler water from said tank.

References Cited by the Examiner
UNITED STATES PATENTS

| | | | |
|---|---|---|---|
| 947,468 | 1/10 | Fish | 137—145 X |
| 3,022,238 | 2/62 | Kolflat | 176—40 |
| 3,042,599 | 7/62 | Biehl | 176—21 |

OTHER REFERENCES

Containment for the EBWR, A. H. Heineman and L. W. Fromm, Peaceful Uses of Atomic Energy, United Nations, 1958, vol. 11, pp. 139–152.

TID-2504 (Del), The Silver-Uranium System, R. W. Buzzard, Fickle, Park; 1953; pp. 319–322.

CARL D. QUARFORTH, *Primary Examiner*.